Patented Nov. 8, 1927.

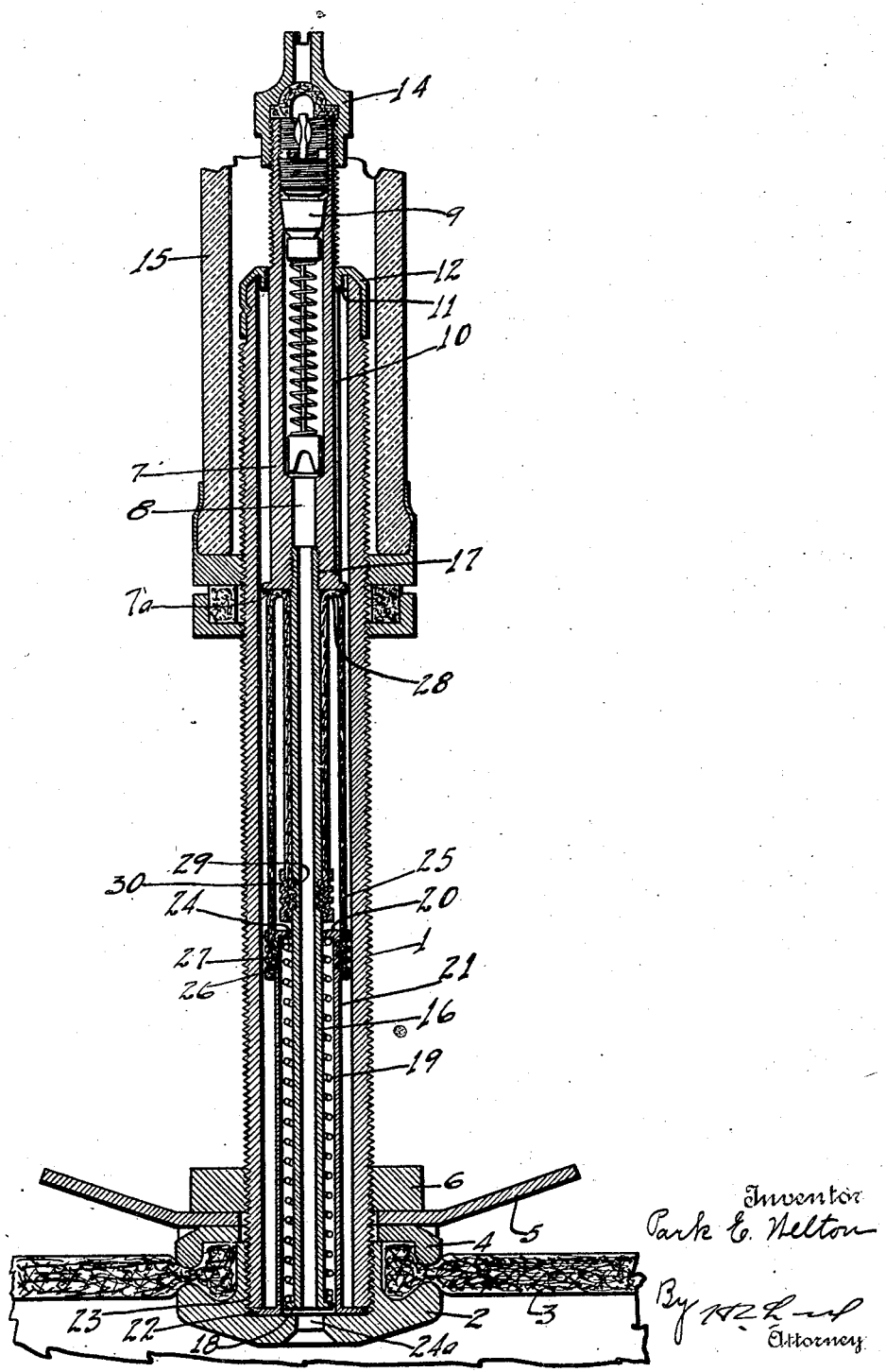

1,648,332

UNITED STATES PATENT OFFICE.

PARK E. WELTON, OF CUYAHOGA FALLS, OHIO, ASSIGNOR TO TIREGAGE VALVE CORPORATION, OF CHARLESTON, WEST VIRGINIA, A CORPORATION OF WEST VIRGINIA.

TIRE PRESSURE GAUGE.

Application filed January 17, 1923. Serial No. 613,256.

Pressure gauges have heretofore been made which have been provided with a moving plunger in the tire stem, the movement of the plunger indicating the pressure to which the tire was subjected, the plunger carrying the valve and serving as a means of inflation. From necessity the plunger must be connected with the tire so as to be subjected to the tire pressure and where the inflation is through the plunger the connection must be such as to complete the inflation conduit leading to the tire. A common means of accomplishing this has been to secure a rubber tube to the plunger and to the inner end of the stem, the rubber tube maintaining the connection as the plunger moves through the stretching of the tube. Great difficulty has been experienced in getting rubber of sufficient strength and elasticity to sustain the strain of continued use without developing leaks and obviously the least escape of air is prohibitive.

With the present invention the strain on the tube is largely eliminated and this is accomplished by folding the tube upon itself and instead of stretching the tube as formerly the movement of the plunger is accommodated by the rolling of the fold. The invention further consists in a convenient means of applying a spring to a guage of this type and to other details of construction which will appear from the specification and claims.

The invention is illustrated in the accompanying drawing in which a central vertical section of the stem is shown.

1 marks the tire stem, 2 the head on the stem, 3 a tire tube, 4 a clamping plate for engaging the tube at the stem, 5 the usual spreader, and 6 a clamping nut for exerting pressure on the clamping plate and securing the spreader.

A plunger 7 is slidingly mounted in the stem. This has an inflation opening 8 through it which is controlled by an inflation valve 9. A key-word 10 is arranged in the plunger and this engages a key 11 on a thimble 12 and locks the plunger against turning as it is subjected to the strain incident to attaching an inflating device. The outer end of the plunger is screw-threaded for convenience of attaching an inflating device and the usual cap 14 is provided for the end of the plunger. A transparent cap 15 is mounted on the stem through which the position of the plunger may be observed to ascertain the pressure to which the tire is subjected.

An extension 16 is secured to the plunger, the plunger being screw-threaded at 17 at its lower end and this extension screwed into the screw-threaded portion. The extension is provided with a shoulder 18 at its lower end and a spring 19 is seated on this shoulder. The upper end of the spring engages an in-turned shoulder 20 on an anchor piece 21. The anchor piece extends up from the head to an intermediate position in the stem and is provided with an out-turned flange 22 at its lower end. This flange is clamped in the bottom of a screw-threaded socket 23 by the end of the stem 1 as it is screwed into the socket in the head.

The upper end of the anchor piece has an opening 24 through which the extension passes. This same opening forms a means of communication through the perforation 24$^a$ in the head and anchor piece 21 which is sealed at its upper end to a rubber tube 25. The rubber tube has one end extending over the upper end of the anchor piece 21, the anchor piece being provided with grooves 26 so as to more readily secure the tube. A band 27 is arranged over the tube, thus clamping the tube on the anchor piece and the tube is folded within itself at 28, the inner portion of the tube extending down along the extension 16. The extension has the grooves 29 arranged in it and the end of the tube is clamped against these grooves so as to form a seal by a band 30. The end of the plunger has a curved face 7$^a$ to follow the contour of the fold 28.

The operation of the device is as follows: The pressure of the tire is communicated through the opening 24$^a$, anchor piece 21, to the tube 25 and this tube, it will be noted, is entirely sealed so that the air under pressure follows up between the outer and inner wall of the tube and the plunger is subjected to the air pressure of the tire and moves outwardly against the resistance of the spring to a point where the spring balances the pressure. The spring is calibrated so that the position of the plunger will indicate the pressure in the tire. It will be noted that as the plunger moves outwardly the fold of the tube varies to accommodate the movement so that the tube itself is subjected to no additional stretching action by reason of the movement of the plunger. Non-elastic material may be, therefore, used if desired although the material should be flexible in order to make the fold. In this way the tube is relieved of excessive strain and its life thus very much extended.

What I claim as new is:—

1. In a tire pressure gauge, the combination of a stem; a plunger in the stem indicating by its movement the tire pressure, said plunger having an extension, said plunger and extension forming a part of the inflation connection; a flexible tube forming an extensible connection between the plunger and the stem, said tube being folded upon itself, the fold varying to accommodate the movement of the plunger, the inner portion of the tube extending along the extension; and a spring arranged around the extension, said spring being more remote from the plunger than the flexible tube and acting on the extension to resist the movement of the plunger.

2. In a tire pressure gauge, the combination of a stem; a plunger in the stem indicating by its movement the tire pressure, said plunger having an extension, said plunger and extension forming a part of the inflation connection; a flexible tube forming an extensible connection between the plunger and the stem, said tube being folded upon itself, the fold varying to accommodate the movement of the plunger, the inner portion of the tube extending along the extension; a spring acting on the extension for resisting the movement of the plunger, said spring being more remote from the plunger than the folded tube; and an anchor piece for the spring and tube arranged intermediate the ends of the stem.

3. In a tire pressure gauge, the combination of a stem; a plunger in the stem indicating by its movement the tire pressure, said plunger having an extension, said plunger and extension forming a part of the inflation connection; a flexible tube forming an extensible connection between the plunger and the stem, said tube being folded upon itself, the fold varying to accommodate the movement of the plunger, the inner portion of the tube extending along the extension; a spring acting on the extension for resisting the movement of the plunger, said spring being more remote from the plunger than the folded tube; an anchor piece for the spring and tube arranged intermediate the ends of the stem, said anchor piece extending to the head; and means for securing the anchor piece in the head.

4. In a tire pressure gauge, the combination of a stem; a valve carrying plunger in the stem indicating by its movement the tire pressure; a flexible tube forming an extensible connection between the plunger and the stem, said tube being folded upon itself, the fold varying to accommodate the movement of the plunger; an extension on the plunger along which the inner portion of the tube extends and to which the inner end of the tube is secured; an anchor piece extending upwardly from the head to an intermediate portion in the stem to which the outer end of the tube is secured, said anchor piece forming a means of connection through the head to the tire; and a spring arranged within the anchor piece and seated against the anchor piece at its upper end and against the extension at its lower end, said spring resisting the movement of the plunger, said spring being more remote from the plunger than the folded tube.

In testimony whereof I have hereunto set my hand.

PARK E. WELTON.